March 24, 1936.  G. SLAYTER ET AL  2,034,925
HOLLOW BUILDING BLOCK
Original Filed Dec. 14, 1932  2 Sheets-Sheet 2
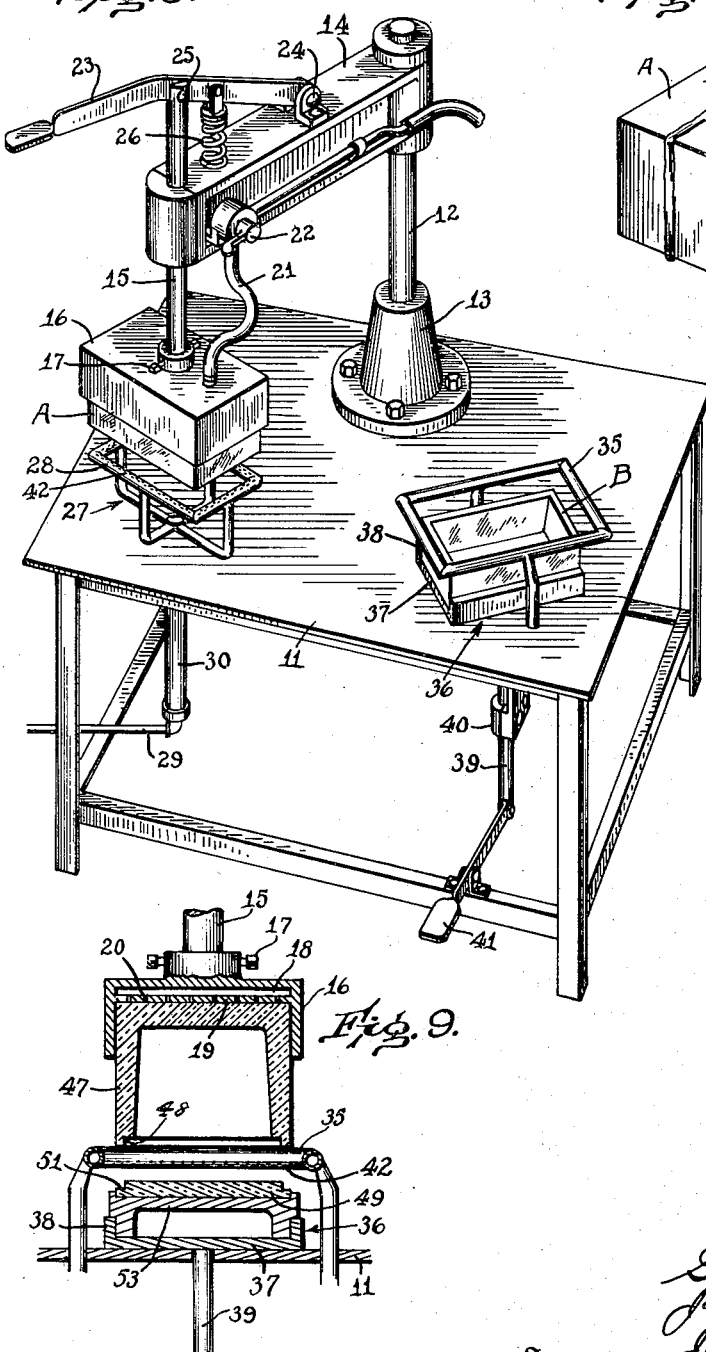
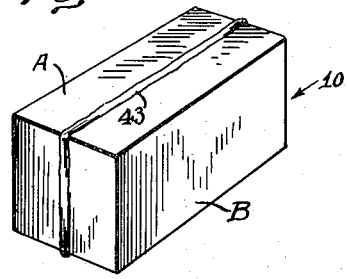
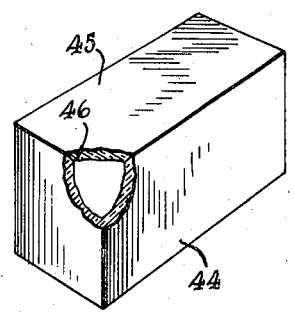
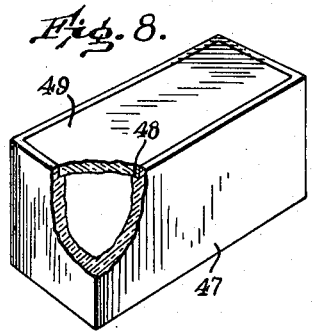
Inventors
Games Slayter
Jan S. Irvine
and
John H. Thomas, Jr.
By J. F. Rule,
Attorney Patented Mar. 24, 1936

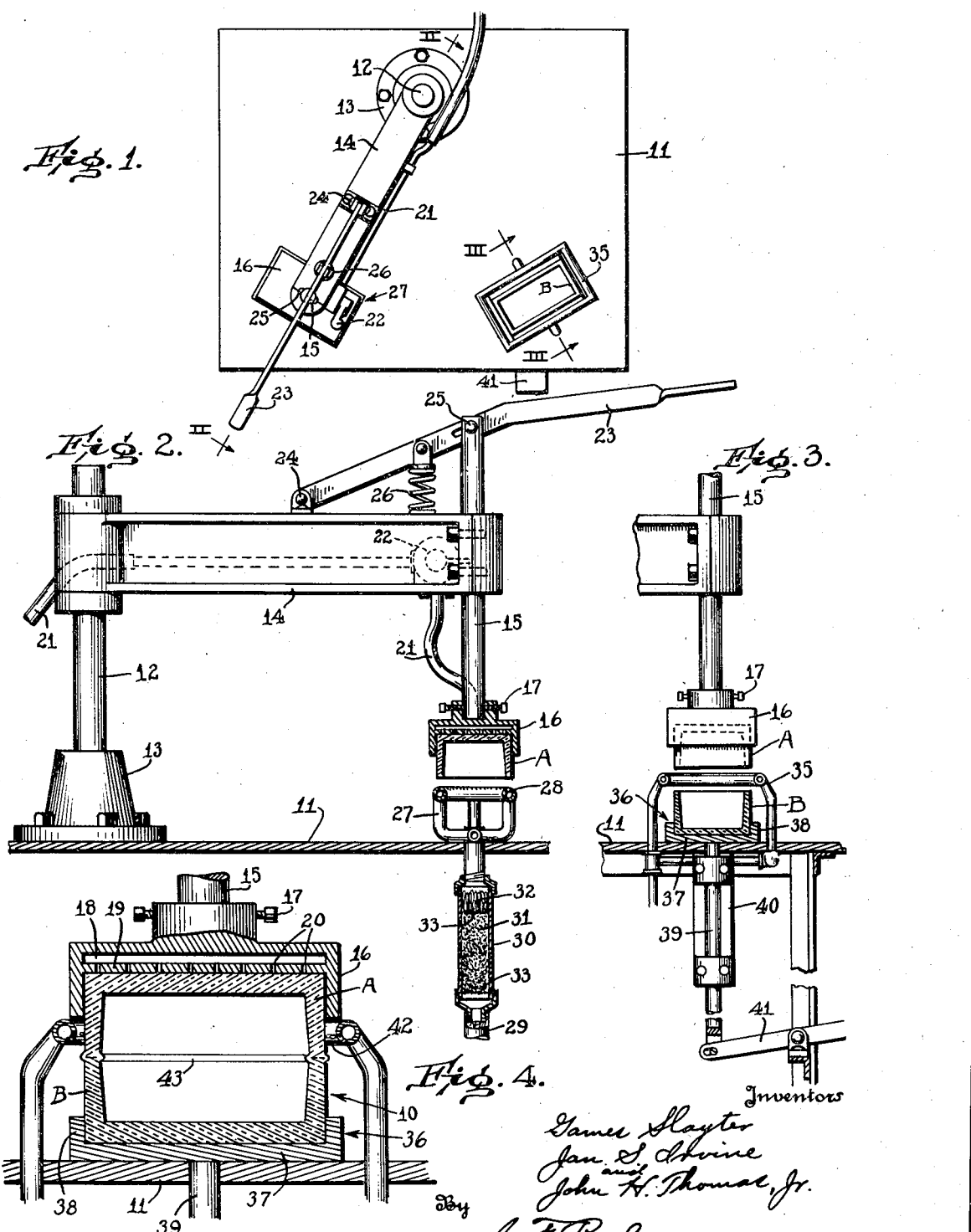

2,034,925

UNITED STATES PATENT OFFICE 2,034,925

HOLLOW BUILDING BLOCK

Games Slayter, Jan S. Irvine, and John H. Thomas, Jr., Newark, Ohio, assignors to Owens-Illinois Glass Company, a corporation of Ohio Application December 14, 1932, Serial No. 647,124
Renewed September 4, 1935

5 Claims. (Cl. 49—1)

Our invention relates to methods and apparatus for manufacturing hollow articles, such as building blocks which may be made of glass or vitreous material and designed for use in building walls or for other structural purposes.

An object of the invention is to provide an improved form of hollow glass block adapted for building purposes, the interior of which provides an air tight chamber.

A further object is to provide a building block of the character indicated, which has high insulating value.

A further object of the invention is to provide a glass building block made of separate parts welded or joined together in such manner that all joints and seams may be covered and hidden from view by the mortar or cement when the blocks are built into a wall.

Other objects of the invention comprise the provision of an improved method and apparatus for welding together two sections or parts to form a complete air tight hollow block.

Other objects of the invention will appear hereinafter.

In the accompanying drawings:

Figure 1 is a top plan view of an apparatus for welding together the two halves or sections of a hollow block.

Fig. 2 is a part sectional side elevation of the apparatus, the section being taken at the line II—II on Fig. 1.

Fig. 3 is a fragmentary sectional elevation substantially at the line III—III on Fig. 1, and also showing the vacuum head shifted to bring the two halves of the block into vertical alignment prior to the welding operation.

Fig. 4 is a sectional view on a larger scale, showing the block and its supporting mechanism at the time of the welding operation.

Fig. 5 is a perspective view of the apparatus shown in Fig. 1.

Fig. 6 is a perspective view of a completed block.

Figs. 7 and 8 are perspective views with portions broken away, showing modified forms of the block.

Fig. 9 is a sectional view showing the two parts of a further modified form of block and means by which they are held for the welding operation.

The building block 10, in its preferred form, is made of glass and comprises two sections A and B molded separately and then welded together by the apparatus herein disclosed to form a complete hollow air tight block.

In the process of manufacturing the block, the two sections may be molded in any conventional or approved type of mold (not shown), and preferably immediately after they are taken from the molds and while still hot are brought under the influence of burners which apply localized heat to the edges which are to be united. The glass forming said edges is thereby heated to a degree at which it becomes soft and plastic. The plastic edges are then brought together and form a weld.

The apparatus for effecting these heating and welding operations will now be described. Such apparatus is mounted on a table 11. A vertical shaft 12 is carried on a base 13 bolted to the table. A horizontal rock arm 14 is supported at one end on the shaft 12 for horizontal swinging movement about the axis of said shaft. Mounted in the free end of the arm 14 for vertical sliding movement is a vertical rod 15. A vacuum head 16, which forms a holder for the upper section A of the building block, is attached to the lower end of the rod 15, being removably secured thereto as by means of set screws 17. The head 16 is of hollow rectangular construction conforming in size and shape to the block A which is placed in inverted position within the holder 16. The holder is formed with a vacuum chamber 18, the lower horizontal wall 19 of which has a multiplicity of small openings 20 extending therethrough. A vacuum pipe or line 21 extends from the vacuum chamber 18 and is connected to any suitable means (not shown) for exhausting the air from the chamber 18. A valve 22 may be placed in the vacuum line 21 for opening and closing the vacuum line.

The holder 16 is movable up and down manually by means of a hand lever 23 which is pivoted at 24 to the arm 14 and has a slot and pin connection 25 with the upper end of the rod 15. A coil spring 26 is interposed between the lever 23 and the arm 14 and serves to counterbalance the weight of the holder 16 and the block A therein.

A burner 27 is mounted on the table 11 and is adapted to apply localized heat to the lower marginal portion of the block A while the latter is supported in the vacuum head 16. The burner comprises a horizontal rectangular pipe section 28 which conforms in size and shape to the lower margin of the block A and is formed with a multiplicity of upwardly directed openings for directing heating flames against the lower edge of the block. Fuel gas is supplied through a pipe 29 to the burner 27. A chamber 30 may be provided in the pipe line 29 and comprises a section which may be filled, for example, with granular alundum 31, and a section packed with copper wire 32.

Copper screens 33 are provided at the ends of the compartment containing the alundum.

A burner 35 is mounted on the table 11 for heating the upper edge or marginal portion of the lower block section B. This burner includes a pipe section bent to the form of an open rectangular frame, horizontally disposed and spaced a sufficient distance above the table to permit the block B to be supported therebeneath in a holder 36. This holder, as shown, comprises a bottom 37 which rests on the table, and vertical side walls 38 extending along opposite edges thereof. The holder 36 is adapted to be moved up and down by means of a vertical post 39 attached to the bottom of the holder and extending downward through an opening in the table. The post 39 is guided in bearings formed in a guide block 40 fixed beneath the table. A foot pedal 41 is operatively connected to the post 39. The rectangular open space defined by the burner 35 is of somewhat greater dimensions laterally than the block B, permitting the block to be moved upward therethrough during the welding process, as hereinafter described. The burner is formed with perforations 42 arranged to direct flames downwardly and inwardly against the upper edge of the block B.

The operation is as follows: The two block sections A and B which have been molded simultaneously are taken from the molds (not shown) when they have cooled sufficiently to retain their shape, and may be immediately placed in the holders 16 and 36, respectively. When the block A is placed in its holder 16, the valve 22 in the vacuum line is opened to exhaust the air from the vacuum chamber 18 and apply suction through the openings 19, thereby securely holding the block. The arm 14 is then swung to the position shown in Figs. 1 and 5 (unless already in such position) so that the block A is directly over the burner 27 with its lower edge facing the burner. The vacuum head 16 is then lowered by means of the hand lever 23 to bring the lower edge of the block in close proximity to the burner, permitting said edge to be heated to a sufficiently high temperature to soften the glass for welding.

While the upper block section A is being thus heated, the lower section B also has its edge heated to a welding temperature. For this purpose, the platform or holder 36 is raised by means of the foot pedal 41 so that the block B can be conveniently placed thereon and is then lowered as shown in Figs. 3 and 5, into operative position relative to the burner 35.

When the edges of both blocks have thus been brought to a welding temperature, at which the glass is soft and sticky or viscous, the holder 16 is raised by releasing or lifting the hand lever 23, and the arm 14 is then swung laterally to bring the section A directly over the section B, as shown in Fig. 3. The lever 23 may now be depressed to lower the section A so that the heated edges of the two blocks are brought together and held together with sufficient pressure to produce a weld. When the welding operation is completed, the valve 22 may be closed, releasing said head from the glass block. The vacuum head is then raised and swung to one side. The platform 36 is now raised by means of the foot pedal, carrying the welded block upward through the burner 35, and the block removed.

The completed block 10 (Figs. 4 and 6) may comprise a ridge or seam 43 where the glass has been thickened or spread by the welding process. This seam extends along the surfaces to which mortar or cement is applied when the blocks are built into a wall, so that the same is entirely hidden from view. The bottom surfaces of the sections A and B, respectively, thus become the inner and outer faces of the block as built into the wall.

Fig. 7 shows a modified form of hollow glass block comprising a main section or body 44 and a cover plate 45 which may be welded together in substantially the same manner as hereinbefore described in connection with the block 10. The meeting edges 46 of the two sections are beveled so that the meeting lines of the two parts on the exterior surface of the block are coincident with the edges of the top surface of the block.

Fig. 8 shows a further modification in which the body portion 47 of the block is formed with a square recess 48 along its top inner margin, providing a seat for the cover block 49, the latter when seated having its top surface substantially flush with the top edge of the body 47.

Fig. 9 shows a further modification of the cover block 49 which in this instance is formed with a recess 51 to receive the marginal flange portion of the block 47. In order to hold the cover plate 49 in operative relation to the burner 35, a supplemental platform 53 is mounted on the support 37 to receive said cover plate, thereby raising the latter into close proximity to the burner. The welding process for this form of block, as well as the forms disclosed in Figs. 7 and 8, is substantially identical to that above described in connection with the block 10.

Modifications may be resorted to within the spirit and scope of our invention.

What we claim is:

1. Glass welding apparatus comprising a burner, means for supporting one section of a glass block beneath the burner, the latter constructed to direct a heating flame against a marginal surface of said section and thereby heating it to a welding temperature, a second burner, a holder for a complemental section of said block by which said complemental section is held over said second burner, the latter being constructed to direct a heating flame upwardly against a lower marginal surface of said complemental section and heat it to a welding temperature, a horizontal rock arm carrying said holder and arranged to swing horizontally and thereby swing said holder with said complemental section therein to a position over said first named section, and means for then bringing said sections together with their heated surfaces in contact.

2. The combination of a table, a horizontally disposed rectangular burner spaced above the table, a support beneath said burner for one section of a hollow glass block by which a marginal surface of the block is held beneath and in operative relation to the burner, a second burner mounted on said table, a vertical shaft supported on the table, a horizontal arm connected at one end to said shaft, a holder supported at the opposite end of said arm, said holder comprising means for holding a complemental section of the glass block above and in operative relation to said second burner, means for swinging said arm about the axis of said vertical shaft and thereby swinging the holder thereon laterally to a position over said first mentioned burner, and means for lowering said holder and thereby bringing the said block sections into welding engagement.

3. Glass welding apparatus comprising a table, a horizontal rock arm spaced above the table and mounted to oscillate horizontally over the table, a vertical rod mounted on said arm and movable up and down, a lever for effecting said movements of said rod, a vacuum head mounted on the lower end of said rod and forming a holder for the upper section of a hollow glass block, means for applying suction to said head and thereby holding said block section thereon, a second holder for supporting the lower section of said glass block on the table, burners arranged to heat the marginal edges of said blocks, said arm arranged to swing said vacuum head and block laterally to a position above the lower block section, permitting the upper section to be lowered into welding engagement with the lower section, and means for lifting said second holder and thereby lifting the welded block upwardly through said first mentioned burner.

4. Glass welding apparatus comprising a stationary burner, means for supporting one section of a glass block beneath the burner, the latter constructed to direct a heating flame against a marginal surface of said section and thereby heating it to a welding temperature, a second stationary burner, a holder for a complemental section of said block by which said complemental section is held over said second burner, the latter being constructed to direct a heating flame upwardly against a lower marginal surface of said complemental section and heat it to a welding temperature, a carrier on which said holder is supported, means for actuating said carrier and thereby laterally moving said holder bodily with said complemental section from its position over said second burner to a position in which said complemental section is directly over said first named section, and means for then bringing said sections together with their heated surfaces in contact.

5. Glass welding apparatus comprising a stationary burner, means for supporting one section of a hollow glass block beneath the burner with a marginal surface of said section facing upward, the burner being constructed and arranged to direct a heating flame downwardly against said marginal surface and thereby heat it to a welding temperature, a second stationary burner, said burners being laterally spaced apart, a holder for a complemental section of said block by which said complemental section is held over said second burner, with a marginal surface of said complemental section facing downward, the said second burner being constructed and arranged to direct a heating flame upwardly against said downwardly facing marginal surface and heat it to a welding temperature, and means for moving said holder and the block section held thereby, laterally away from said second burner, and downwardly into position to bring the block sections together with their heated surfaces in contact and thereby weld said sections together.

GAMES SLAYTER.
JAN S. IRVINE.
JOHN H. THOMAS, Jr.